March 28, 1939.  A. J. MUSSELMAN  2,152,386

SPEED CONTROL MECHANISM

Filed Oct. 4, 1937   2 Sheets-Sheet 1

INVENTOR.
ALVIN J. MUSSELMAN
BY
Kwis Hudson & Kent
ATTORNEYS

March 28, 1939.  A. J. MUSSELMAN  2,152,386
SPEED CONTROL MECHANISM
Filed Oct. 4, 1937  2 Sheets-Sheet 2
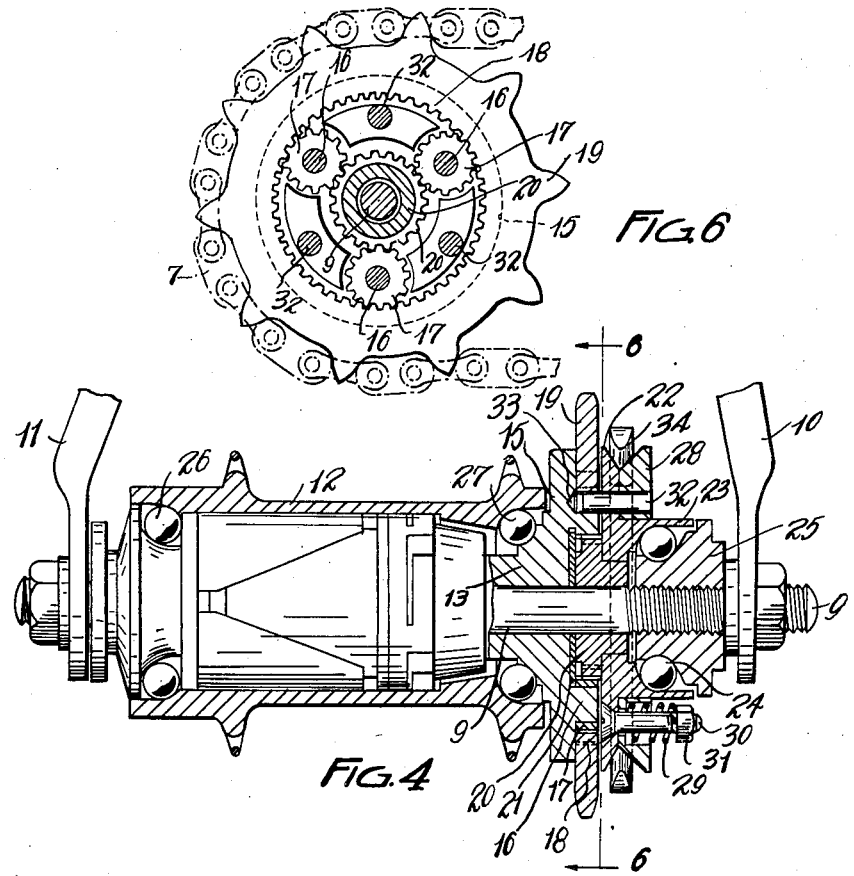
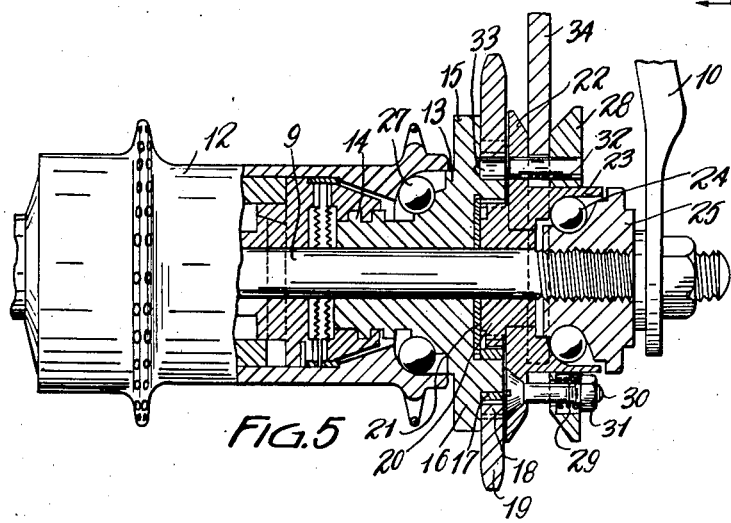
INVENTOR.
ALVIN J. MUSSELMAN
BY
Kwis Hudson & Kent
ATTORNEYS Patented Mar. 28, 1939

2,152,386

UNITED STATES PATENT OFFICE 2,152,386

SPEED CONTROL MECHANISM

Alvin J. Musselman, Cleveland Heights, Ohio

Application October 4, 1937, Serial No. 167,087

6 Claims. (Cl. 74—290)

This invention relates to improvements in speed control mechanism, particularly mechanism of this character for use upon bicycles equipped with two-speed gearing in the rear hub of the bicycle.

One of the objects of the invention is the provision of a gear shifter which may be mounted exclusively on the frame of the bicycle, and which in one operative position thereof is completely out of engagement with the rear wheel hub of the bicycle thereby permitting removal of the rear wheel without disturbing the shifter.

Another object is the provision of extremely simple means for holding stationary certain of the gears of a planetary gear transmission in order to cause the transmission to function for low speed drive.

Other objects and features of novelty will appear as I proceed with the description of that embodiment of the invention which, for the purposes of the present application, I have illustrated in the accompanying drawings, in which Fig. 1 is a side elevational view of the rear hub and forks of a bicycle in which my invention is embodied, the gear shifter being shown in its forward position corresponding to high speed or direct drive.

Fig. 4 is a central sectional view of the rear hub of a bicycle with the gearing in high speed.

Fig. 5 is a similar view with the gearing in low speed position, and

Fig. 6 is a cross sectional view taken substantially on the line 6—6 of Fig. 4.

Figure 1:
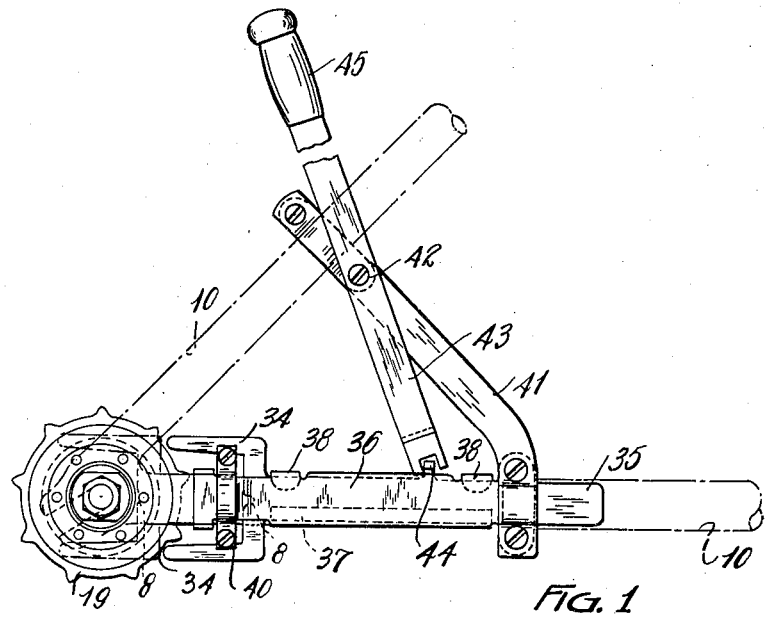

In the drawings the rear forks of a bicycle are indicated at 10 and 11, and the rear wheel coaster brake hub is shown at 12. Associated with this hub there is a planetary gear transmission which when in operation reduces the speed of the hub and increases the torque delivered to the hub by the pedal-driven chain, not shown. The transmission elements may be locked together to revolve as a unit however, in which case there is direct drive just as in the conventional coaster brake hub. The details of the coaster brake form no part of the present invention and will not be described herein. Such mechanism as is herein illustrated by way of example is fully described in my Patent 1,911,461, issued May 30, 1933.

In the present case I have substituted for the worm ordinarily employed in coaster brakes an element 13 rotatably mounted on the axle 9.
In this element there is incorporated a worm 14 which functions like the conventional worm, as well as a support 15 upon which are carried the planet gears of my transmission. The support 15 is provided at three equally spaced points of a concentric circle with stub shafts 16, upon which are mounted for rotation planet gears 17. Surrounding the planet gears and meshing with them there is an internal gear 18 formed upon a sprocket ring 19 over the teeth of which runs a sprocket chain 7, driven by the pedals of the bicycle.

A run gear 20 is rotatably mounted on axle 9 adjacent the element 13 but with a washer 21 interposed between them. Gear 20 meshes with all of the planet gears 17. It is made either integral with or is rigidly attached to a plate 22 that extends outwardly in the radial direction far enough to prevent any axial displacement of sprocket ring 19. The hub of plate 22 has an outward extension 23 within which is formed a ball race for bearing balls 24. The inner race for these balls is formed in a nut 25 which is threaded upon the axle 9. The hub 12 of the wheel is mounted on ball bearings 26 and 27, and all of these bearings may be adjusted simultaneously by the movement of nut 25 in one direction or the other.

A second disk 28 of ring form is mounted to slide on the hub extension 23 of disk 22. Disk 28 is normally forced to its inward position, illustrated in Fig. 4, by a series of coil springs 29 surrounding bolts 30 which are set into counterbored holes in disk 22 and extend through aligning holes in disk 28, the springs 29 bearing at one end against disk 28 and at the other end against nuts 31 carried by the bolts. At regularly spaced points disks 28 have rigidly mounted therein pins 32 which extend slidably through holes in disk 22 and are adapted to enter sockets 33 in the pinion support 15.

The disks 22 and 28 may be forced apart, that is to say disk 28 may be moved outwardly away from disk 22, by a yoke 34, see particularly Fig. 1. The arms of this yoke are tapered on their inner sides and made V-shaped in cross section, so that when the yoke is moved rearwardly from its position of Fig. 1 to its position of Fig. 2 it cams apart the two disks 22 and 28. In the cross member of the yoke I form a notch 8, the purpose of which will presently appear. The yoke 34 is preferably formed at the rear end of a slide bar 35 that is mounted in suitable guides supported upon the lower tube of the rear fork 10. To this end I employ a bracket which has a front wall 36, a lower inwardly and upwardly extending lip 37, and to rearwardly and downwardly extending ears 38. The bar 35 is confined between lip 37 and ears 38 and slides freely therein. At its rear end the bracket has a laterally extending arm 39 which is secured to the lower tube of fork 10 by a clamp strip 40. The opposite end of bracket 36 stands directly behind the lower tube of fork 10, to which it is secured by bolts extending through the lower end of a brace 41. The upper end of this brace is clamped to the upper tube of fork 10. Brace 41, in addition to clamping the forward end of bracket 36, serves as a support for the pivotal mounting 42 of a shift lever 43 which at its lower extremity is bifurcated to straddle an upwardly projecting finger 44 on slide bar 35. The lever 43 extends upwardly to a position within reach of the driver's hand, that is to say below and somewhat to the rear of the bicycle seat. A rubber grip 45 may be provided on the handle end of the lever.

*Operation.*—It will be apparent from the above that when the shift lever is in the position illustrated in Fig. 1 the springs 29 act to hold plate 28 against plate 22, as in Fig. 4. The pins 32 will then extend through plate 22 into the sockets 33 in support 15. These parts are therefore locked together, which means that sun gear 20, being rigid with disk 22, is locked to the support for the planet gears, preventing rotation of those gears upon their stub shafts. Consequently the sprocket ring 19 cannot turn relatively to the carrier 15 for the planet gears. Therefore when the drive chain, not shown, delivers force tending to rotate sprocket ring 19 all of the parts between the bearings 24 and 27 revolve as a unit, and the transmission is in direct drive position.

Figure 2:
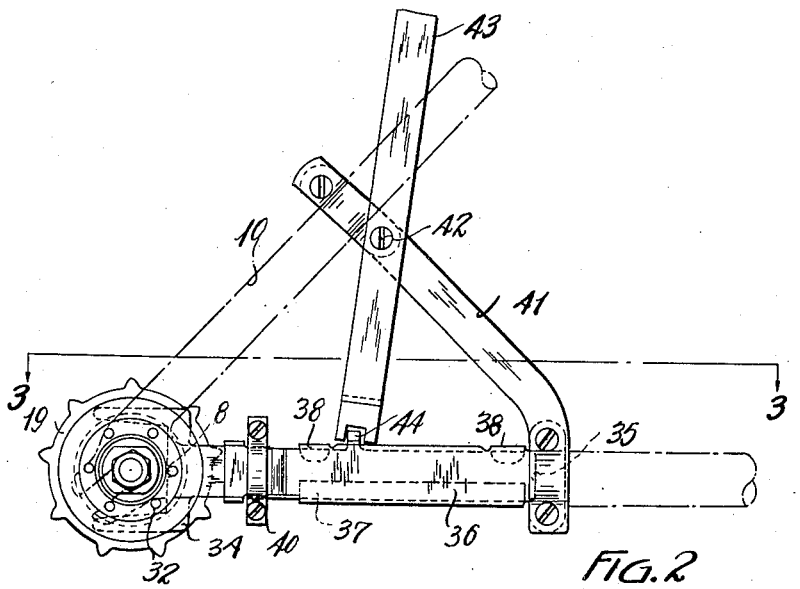
Fig. 2 is a similar view with the shifter in its rear or low speed position.
Figure 3:
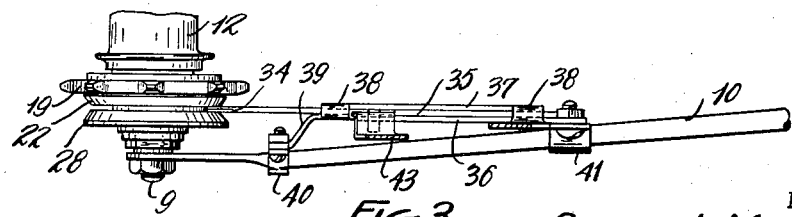
Fig. 3 is a fragmental plan view, partly in horizontal section on the line 3—3 of Fig. 2, with the shifter in the low speed position.

Now, when the bicycle rider comes to a hill, a sandy bit of road, or other difficult terrain, he may grasp handle 45 and throw lever 43 to the position illustrated in Fig. 2. This slides the bar 35 and yoke 34 rearwardly, forcing disk 28 outwardly to the position of Fig. 5, thereby withdrawing pins 32 from sockets 33. This brings notch 8 into position to catch and retain one of the pins 32 as soon as it comes into line with the notch, thereby positively holding disk 22 and sun gear 20 against rotation. When the sprocket ring 19 is rotated in a forward direction it turns the planet gears 17 and causes them to revolve about the sun gear 20 in a manner well known in the art. The element 13 which carries worm 14 is therefore rotated in a forward direction at a speed less than that of the sprocket ring, and this driving force is communicated to the hub 12 by the usual coaster brake mechanism.

When the bicycle rider withdraws yoke 34 in order to shift back into high speed position, springs 29 force plate 28 and pins 32 inwardly or toward the left. The pins 32 enter sockets 33 as soon as the rotation of sprocket ring 19 and element 13 brings the sockets 33 into line with the pins, when the whole unit revolves together at high speed as previously described.

When the shift lever 43, slide bar 35 and yoke 34 are in the positions illustrated in Fig. 1, that is, when the transmission is in direct drive or high speed, the yoke is entirely out of the way of the rear hub of the bicycle, and the hub with its wheel may be removed from the bicycle frame in the regular manner without disturbing the shifting mechanism.

The operation of the coaster and of the brake is effected in the usual manner, that is by holding the pedals still in the one case and back pedaling in the other, whether the transmission be in direct drive or in low speed, as will be obvious to those skilled in the art.

Variations from the described structure may be employed. Accordingly, I desire it to be understood that the scope of the invention is to be regarded as defined exclusively by the appended claims rather than by the foregoing description or the accompanying illustration.

Having thus described my invention, I claim:

1. In a bicycle, rear forks, a rear wheel hub mounted between said forks, two-speed gearing incorporated in said hub, and means for changing the ratio of said gearing from one speed to the other comprising a spreader mounted on one of said forks slidable rearwardly into operable engagement with the gearing to set the gearing in one of its two speeds, and slidable forwardly completely out of engagement with the gearing for permitting the gearing to move automatically to its other speed, said hub being removable from the forks when the spreader is in its forward position.

2. In combination with a bicycle having rear forks and a rear hub in which a multi-speed gear is incorporated, a gear ratio changer comprising a slide having a spreader at its rear end adapted to move into operative engagement with the hub, a guide for said slide carried by one of the rear forks of the bicycle, operating means mounted on the fork for shifting said slide into and out of said operative position, the spreader being entirely out of engagement with said hub when the slide is in its forward position.

3. In a bicycle planetary gear transmission, a pair of coaxial plates, one of said plates carrying pins and the other having holes through which said pins extend, spring means tending to draw said plates together, and a slidable spreader adapted when moved toward the axis of said plates to separate the plates, said spreader having a notch arranged to engage one of said pins during a plate separating movement, whereby the plates are held against rotation.

4. In a bicycle planetary gear transmission, a pair of coaxial plates, one of said plates carrying pins adapted to project beyond the other plate through holes in the latter plate for locking the transmission in high gear, spring means tending to draw said plates together, a yoke slidable in a plane between the plates, said yoke having one position out of engagement with the plates permitting free rotation thereof and another position in engagement with the plates spreading them apart against the force of said spring means, whereby the transmission is unlocked, said yoke in the latter position being adapted to grasp one of said pins for holding the plates against rotation.

5. In a bicycle planetary gear transmission, a rear hub, an annular sprocket wheel thereon carrying an internal gear, a driven element carrying planetary gears, a sun gear, a pair of coaxial plates one of which is rigid with said sun gear, spring means tending to hold said plates together, pins carried by one of said plates projecting through holes in the other plate, said pins being adapted to extend beyond the latter plate into holes in the driven element for locking the latter to the sun gear, a yoke slidable in a plane between the plates having one position out of engagement with the plates permitting free rotation thereof with said transmission as a unit, said yoke having another position spreading apart the plates against the force of said spring means and withdrawing the pins from the driven element, said transmission embodying means effective when the yoke is in the latter position for holding said plates against rotation.

6. In a bicycle planetary gear transmission, a rear hub, an annular sprocket wheel thereon carrying an internal gear, a driven element carrying planetary gears, a sun gear, a pair of coaxial plates one of which is rigid with said sun gear, spring means tending to hold said plates together, pins carried by one of said plates projecting through holes in the other plate, said pins being adapted to extend beyond the latter plate into holes in the driven element for locking the latter to the sun gear, a yoke slidable in a plane between the plates having one position out of engagement with the plates permitting free rotation thereof with said transmission as a unit, said yoke having another position spreading apart the plates against the force of said spring means and withdrawing the pins from the driven element, said yoke having a notch therein adapted to receive one of said pins when the yoke is in its rearmost position for holding said plates and said sun gear against rotation while the driven element is free to revolve at a speed less than that of the sprocket.

ALVIN J. MUSSELMAN.